US012775855B2

(12) United States Patent
Ezrielev et al.

(10) Patent No.: US 12,775,855 B2
(45) Date of Patent: Oct. 27, 2026

(54) SYSTEM AND METHOD FOR MANAGING INFERENCE MODEL PERFORMANCE THROUGH INFERENCE GENERATION PATH RESTRUCTURING

(71) Applicant: Dell Products L.P., Round Rock, TX (US)

(72) Inventors: Ofir Ezrielev, Beer Sheva (IL); Jehuda Shemer, Kfar Saba (IL); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 934 days.

(21) Appl. No.: 18/060,112

(22) Filed: Nov. 30, 2022

(65) Prior Publication Data

US 2024/0177026 A1 May 30, 2024

(51) Int. Cl.
*G06N 5/043* (2023.01)

(52) U.S. Cl.
CPC .................................. *G06N 5/043* (2013.01)

(58) Field of Classification Search
CPC ................................................ G06N 5/043
See application file for complete search history.

(56) References Cited

U.S. PATENT DOCUMENTS 7,593,729 B2 9/2009 Barak
10,142,174 B2 11/2018 Yang et al.
10,341,354 B2 7/2019 Murugesan et al.
10,853,129 B1 12/2020 Sengupta
11,216,482 B2 1/2022 Khillar et al.
11,886,960 B2 1/2024 Kaufmann
2008/0256167 A1 10/2008 Branson
2016/0098297 A1 4/2016 Yuyitung
2018/0365576 A1 12/2018 Guttmann
2019/0050505 A1 2/2019 Nendorf
2019/0102700 A1 4/2019 Babu
(Continued)

OTHER PUBLICATIONS

"A systematic literature review on distributed machine learning in edge computing", Filho et al. pp. 1-36 Mar. 30, 2022.*
(Continued)

*Primary Examiner* — Sherrod L Keaton
(74) *Attorney, Agent, or Firm* — WOMBLE BOND DICKINSON (US) LLP

(57) ABSTRACT

Methods and systems for managing execution of an inference model hosted by data processing systems are disclosed. To manage execution of the inference model hosted by the data processing systems, a system may include an inference model manager and any number of data processing systems. The inference model manager may monitor the risk of unsuccessful execution of the inference model by the data processing systems and may proactively take action to support inference generation in the event of reduced functionality of one or more of the data processing systems. The inference model manager may distribute multiple redundant instances of the inference model so that each data processing system only hosts one instance of the inference model. Inference model manager may also obtain an execution plan to respond to a failure of one or more data processing systems to ensure no inference model bottlenecks occur during re-deployment of the inference model.

20 Claims, 7 Drawing Sheets

(56) References Cited

U.S. PATENT DOCUMENTS

| | | | | |
|---|---|---|---|---|
| 2019/0266504 | A1 | 8/2019 | Apparao | |
| 2020/0027157 | A1 | 1/2020 | Xu | |
| 2020/0104749 | A1 | 4/2020 | Sartorello | |
| 2020/0145448 | A1 | 5/2020 | Vu | |
| 2020/0193218 | A1* | 6/2020 | Liu | G06V 10/955 |
| 2020/0193313 | A1 | 6/2020 | Ghanta | |
| 2020/0219007 | A1 | 7/2020 | Byers | |
| 2021/0255886 | A1 | 8/2021 | Von | |
| 2021/0319098 | A1 | 10/2021 | Pogorelik | |
| 2022/0036160 | A1 | 2/2022 | Sasagawa | |
| 2022/0156368 | A1 | 5/2022 | Spyridopoulos | |
| 2022/0237506 | A1 | 7/2022 | Feldman | |
| 2022/0269835 | A1 | 8/2022 | Yang | |
| 2022/0414503 | A1 | 12/2022 | Park | |
| 2023/0010769 | A1 | 1/2023 | Umezawa | |
| 2023/0012487 | A1 | 1/2023 | Makaya | |
| 2023/0168932 | A1 | 6/2023 | Rafferty | |
| 2023/0168950 | A1 | 6/2023 | Lee | |
| 2023/0252328 | A1 | 8/2023 | Swami | |
| 2023/0267344 | A1 | 8/2023 | Chang | |
| 2023/0273813 | A1 | 8/2023 | Fong | |
| 2023/0342203 | A1 | 10/2023 | Yang | |
| 2024/0020296 | A1 | 1/2024 | Ezrielev | |
| 2024/0020555 | A1 | 1/2024 | Ezrielev | |
| 2025/0030766 | A1 | 1/2025 | Dubey | |
| 2025/0265383 | A1 | 8/2025 | Nendorf | |

OTHER PUBLICATIONS

"Model-driven Cluster resource management for AI workload in edge clouds", Liang et al. ("Liang"), pp. 1-25, Jul. 1, 2022.*

"A systematic literature review on distributed machine learning in edge computing", Filho et al. ("Filho") pp. 1-36 Mar. 30, 2022.*

Eck, B., Fusco, F., Gormally, R., Purcell, M., & Tirupathi, S. (Mar. 24, 2020). "Scalable deployment of AI time-series models for IoT." arXiv preprint arXiv:2003.12141. (7 pages).

Chen, B., Eck, B., Fusco, F., Gormally, R., Purcell, M., Sinn, M., & Tirupathi, S. (Nov. 2018). "Castor: Contextual IoT time series data and model management at scale." In 2018 IEEE International Conference on Data Mining Workshops (ICDMW) (pp. 1487-1492). IEEE. Retrieved from <https://arxiv.org/pdf/1811.08566> on Oct. 10, 2025. (6 pages).

Saeed et al., "Model Adaptation and Personalization for Physiological Stress Detection." Oct. 2018. (Year: 2018) Retrieved from <https://tstojan.github.io/pub/DSAA2018_ModelAdaptandPersonPhysiologicaStressDetection.pdf> on Oct. 13, 2025. (8 pages).

Zhang et al., "Bandwidth-Efficient Multi-Task AI Inference with Dynamic Task Importance for the Internet of Things in Edge Computing." Aug. 2022. (Year: 2022) (13 pages).

"Software performance testing", Wikipedia, Wikimedia Foundation, https://en.wikipedia.org/wiki/Software_performance_testing (8 Pages).

"The Ultimate Guide to Performance Testing and Software Testing: Testing Types, Performance Testing Steps, Best Practices, and More", Stackify, Apr. 16, 2021, https://stackify.com/ultimate-guide-performance-testing-and-software-testing/ (23 Pages).

"High availability software", Wikipedia, Wikimedia Foundation, https://en.wikipedia.org/wiki/High_availability_software (5 Pages).

"Load balancing (computing)", Wikipedia, Wikimedia Foundation, https://en.wikipedia.org/wiki/Load_balancing (computing) (17 Pages).

Thompson, Julie D. et al., "Multiple Sequence Alignment Using ClustalW and ClustalX", Current Protocols in Bioinformatics (2003) 2.3.1-2.3.22 (22 Pages).

Zhao, Shixiong et al., "HAMS: High Availability for Distributed Machine Learning Service Graphs", 2020 50th Annual IEEE/IFIP International Conference on Dependable Systems and Networks (DSN). IEEE, 2020 (13 Pages).

Hu, Chenghao et al., "Distributed Inference with Deep Learning Models across Heterogeneous Edge Devices." IEEE Infocom 2022—IEEE Conference on Computer Communications. IEEE, 2022 (8 Pages).

Abadi, Martin et al. (Mar. 16, 2016). "TensorFlow: Large-Scale machine learning on heterogeneous distributed systems." arXiv.org. <https://arxiv.org/abs/1603.04467> (19 pages).

Liang et al., "Model-driven Cluster Resource Management for AI Workloads in Edge Clouds"; arXiv:2201.07312v1 [cs.DC] Jan. 18, 2022; Total pp. 23 (Year: 2022), Retrieved from <https://arxiv.org/abs/2201.07312> on Sep. 2, 2025.

Filho et al., "A Systematic Literature Review on Distributed Machine Learning in Edge Computing"; Sensors 2022, 22, 2665. Published Mar. 23, 2022; Total pp. 36 (Year: 2022), Retrieved from <https://doi.org/10.3390/s22072665> on Sep. 2, 2025.

Mao et al., "A Survey on Mobile Edge Computing: The Communication Perspective", arXiv: 1701.01090v4 [cs.IT], Jun. 13, 2017 (37 pages).

Shi et al., "Communication-Efficient Edge AI: Algorithms and Systems", arXiv: 2002.09668v1 [cs.IT], Feb. 22, 2020 (24 pages).

* cited by examiner

SYSTEM AND METHOD FOR MANAGING INFERENCE MODEL PERFORMANCE THROUGH INFERENCE GENERATION PATH RESTRUCTURING

FIELD

Embodiments disclosed herein relate generally to inference generation. More particularly, embodiments disclosed herein relate to systems and methods to increase likelihood of successful inference generation by an inference model.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
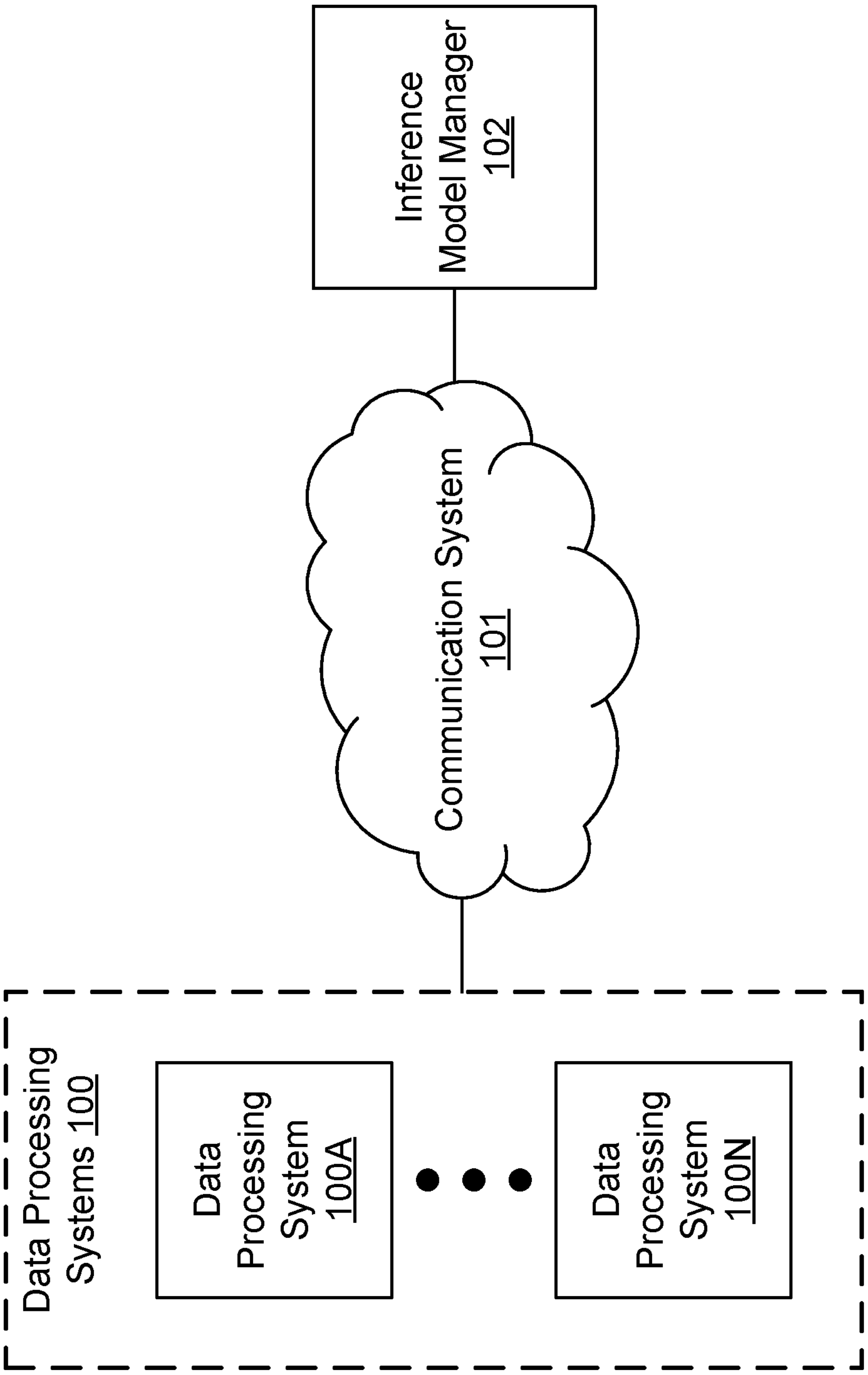
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing execution of an inference model throughout a distributed environment. To manage execution of the inference model, the system may include an inference model manager and any number of data processing systems. Multiple instances of the inference model may be deployed to the data processing systems to support continued inference generation in the event of failure (or otherwise reduced functionality) of one or more of the data processing systems. However, multiple redundant instances of at least a portion of the inference model may be hosted by one data processing system, leading to an inference model bottleneck. Failure of the inference model bottleneck may decrease the reliability of inference generation throughout the distributed environment.

To increase the reliability of inference generation, the inference model manager may monitor a risk of unsuccessful execution of the inference model by each data processing system. If the risk of unsuccessful execution of the inference model by a data processing system is above a threshold, the inference model manager may take action to avoid future inference model bottlenecks and/or other barriers to successful inference generation by the inference model.

To proactively support successful execution of the inference model, the inference model manager may determine whether the at-risk data processing system hosts multiple redundant instances of at least a portion of the inference model. If the at-risk data processing system hosts multiple redundant instances of the inference model, the inference model manager may obtain a deployment plan and an execution plan. The deployment plan may include instructions for re-deployment of the inference model so that each data processing system hosts only one redundant copy of the inference model. Inferences may be generated using the re-deployed inference model.

To prepare for a potential future failure of the at-risk data processing system, the inference model manager may also obtain the execution plan. The execution plan may include instructions for re-configuring the data processing systems in response to a failure of one or more data processing systems so that each data processing system hosts only one redundant copy of the inference model. By doing so, inference model bottlenecks may be avoided and the likelihood of successful completion of the inference model may be increased.

Thus, embodiments disclosed herein may provide an improved system for inference generation by the inference model deployed across the multiple data processing systems. The improved system may monitor the risk of unsuccessful inference generation and may take proactive action to prevent inference generation failure throughout the distributed environment. Consequently, a distributed environment in accordance with embodiments disclosed herein may have a higher likelihood of successful inference generation when compared to systems that do not implement the disclosed embodiments.

In an embodiment, a method of managing execution of an inference model hosted by data processing systems is provided. The method may include: identifying that a first data processing system of the data processing systems has a level of risk of failing to execute a portion of the inference model that is above a threshold; based on the identification: performing an inference generation path analysis for the first data processing system to identify whether the first data processing system is an inference model bottleneck; in an instance of the inference generation path analysis where the first data processing system is the inference model bottleneck: obtaining a deployment plan that distributes multiple redundant instances of the inference model so that only one of the instances of the inference model is hosted by the first data processing system; obtaining an execution plan for responding to a failure of the first data processing system, the execution plan ensuring that one or more other inference model bottlenecks are not formed when the only one of the instances of the inference model is re-deployed across the data processing systems based on the execution plan; deploying the inference model across the data processing systems based on the deployment plan; automatically initiating re-deployment of the inference model in response to a failure of the first data processing system based on the execution plan to obtain a re-deployed inference model; and generating, using the re-deployed inference model, an inference.

Performing the inference generation path analysis may include: identifying one or more portions of the inference model hosted by the first data processing system; making an identification of an inference generation path associated with each of the one or more portions of the inference model hosted by the first data processing system; and in an instance of the identification where there is more than one inference generation path associated with the first data processing system: identifying the first data processing system as the inference model bottleneck.

A failure of the inference model bottleneck may prevent timely execution of one or more redundant instances of the inference model.

The failure of the inference model bottleneck may prevent timely execution of all of the redundant instances of the inference model deployed across the data processing systems.

The inference generation path may include: a listing of instances of each of the portions of the inference model usable to generate an inference model result; and an ordering of the listing of the instances.

Obtaining the deployment plan may include: identifying the one or more portions of the inference model hosted by the first data processing system; identifying a second data processing system, the second data processing system currently not hosting any portions of the inference model; obtaining an updated inference generation path for one of the portions of the inference model hosted by the first data processing system based on the second data processing system; and obtaining inference generation instructions for the data processing systems that are members of the updated inference generation path.

The inference generation instructions may indicate a processing result transmission destination for each of the data processing system that are members of the updated inference generation path.

The deployment plan may ensure that each data processing system of the data processing systems is part of only one inference generation path for the inference model.

Deploying the inference model across the data processing systems based on the deployment plan may include: configuring the data processing systems that are members of the updated inference generation path to forward processing results based on the inference generation instructions.

The execution plan may indicate a failover inference generation path for an instance of the inference model hosted by the second data processing system.

The failover inference generation path may include: an updated listing of the instances of each of the portions of the inference model usable to generate the inference model result, the updated listing indicating replacement of the first data processing system with a third data processing system responsive to failure of the first data processing system, and the third data processing system not hosting any portion of the inference model prior to the failure of the first data processing system.

Automatically initiating re-deployment of the inference model may include: identifying the failure of the first data processing system; identifying the failover inference generation path based on the execution plan; and re-deploying the inference model based on the failover inference generation path.

Re-deploying the inference model may include: deploying the portion of the inference model hosted by the first data processing system to the third data processing system; and transmitting updated inference generation instructions to the data processing systems, the updated inference generation instructions being based, at least in part, on the failover inference generation path.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing an inference model hosted by data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by the inference model hosted by the data processing systems throughout the distributed environment.

To facilitate execution of the inference model, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of the inference model.

For example, all, or a portion, of data processing systems 100 may provide computer-implemented services to users and/or other computing devices operably connected to data processing systems 100. The computer-implemented services may include any type and quantity of services including, for example, generation of a partial or complete processing result using the inference model. Different data processing systems may provide similar and/or different computer-implemented services.

The quality of the computer-implemented services may depend on the accuracy of the inferences and, therefore, the complexity of the inference model. An inference model capable of generating accurate inferences may consume an undesirable quantity of computing resources during operation. The addition of a data processing system dedicated to hosting and operating the inference model may increase communication bandwidth consumption, power consumption, and/or computational overhead throughout the distributed environment. Therefore, the inference model may be partitioned into inference model portions and distributed across multiple data processing systems to utilize available computing resources more efficiently throughout the distributed environment.

As part of the computer-implemented services, inferences generated by the inference model may be provided to a downstream consumer. To increase the reliability of inference generation by the inference model, multiple redundant instances of the inference model may be partitioned and deployed across the data processing systems. A first data processing system of the data processing systems may host more than one redundant instance of the inference model. Hosting the inference model may include hosting all or a portion of the inference model. However, failure of the first data processing system may reduce the reliability of inference generation throughout the distributed environment by negatively impacting multiple instances of the inference model. In the event of failure and/or otherwise reduced functionality of the first data processing system (e.g., processing slow down, lack of available power to perform computations, etc.), inference model manager 102 may re-configure the data processing systems and/or re-deploy the inference model to further support continuity of inference generation.

In general, embodiments disclosed herein may provide methods, systems, and/or devices for managing execution of an inference model hosted by data processing systems 100. To manage execution of the inference model hosted by data processing systems 100, a system in accordance with an embodiment may monitor risk of unsuccessful execution of the inference model by a first data processing system. If the risk of unsuccessful execution of the inference model by the first data processing system is above a threshold, inference model manager 102 may determine whether the first data processing system is an inference model bottleneck (e.g., a data processing system hosting more than one redundant copy of at least a portion of the inference model).

If the first data processing system is an inference model bottleneck, inference model manager 102 may re-configure the data processing systems based on a deployment plan. The deployment plan may include instructions for distributing redundant instances of the inference model so that only one instance of an inference model is (at least partially) hosted by the first data processing system.

Inference model manager 102 may also proactively identify an execution plan in response to identifying the first data processing system as an inference model bottleneck. The execution plan may include instructions for responding to a failure of the first data processing system so that one or more additional inference model bottlenecks are not formed during re-deployment of the inference model in response to the failure.

To provide its functionality, inference model manager 102 may (i) perform an inference generation path analysis of the first data processing system, and/or (ii) determine whether the first data processing system is an inference model bottleneck. If the first data processing system is an inference model bottleneck, inference model manager 102 may (i) obtain a deployment plan that distributes multiple redundant instances of the inference model so that only one of the instances of the inference model is hosted by the first data processing system, (ii) obtain an execution plan for responding to a failure of the first data processing system, (iii) deploy the inference model across the data processing systems based on the deployment plan, (iv) automatically initiate re-deployment of the inference model based on the execution plan to obtain a re-deployed inference model, and/or (v) generate an inference using the re-deployed inference model.

Figure 3:
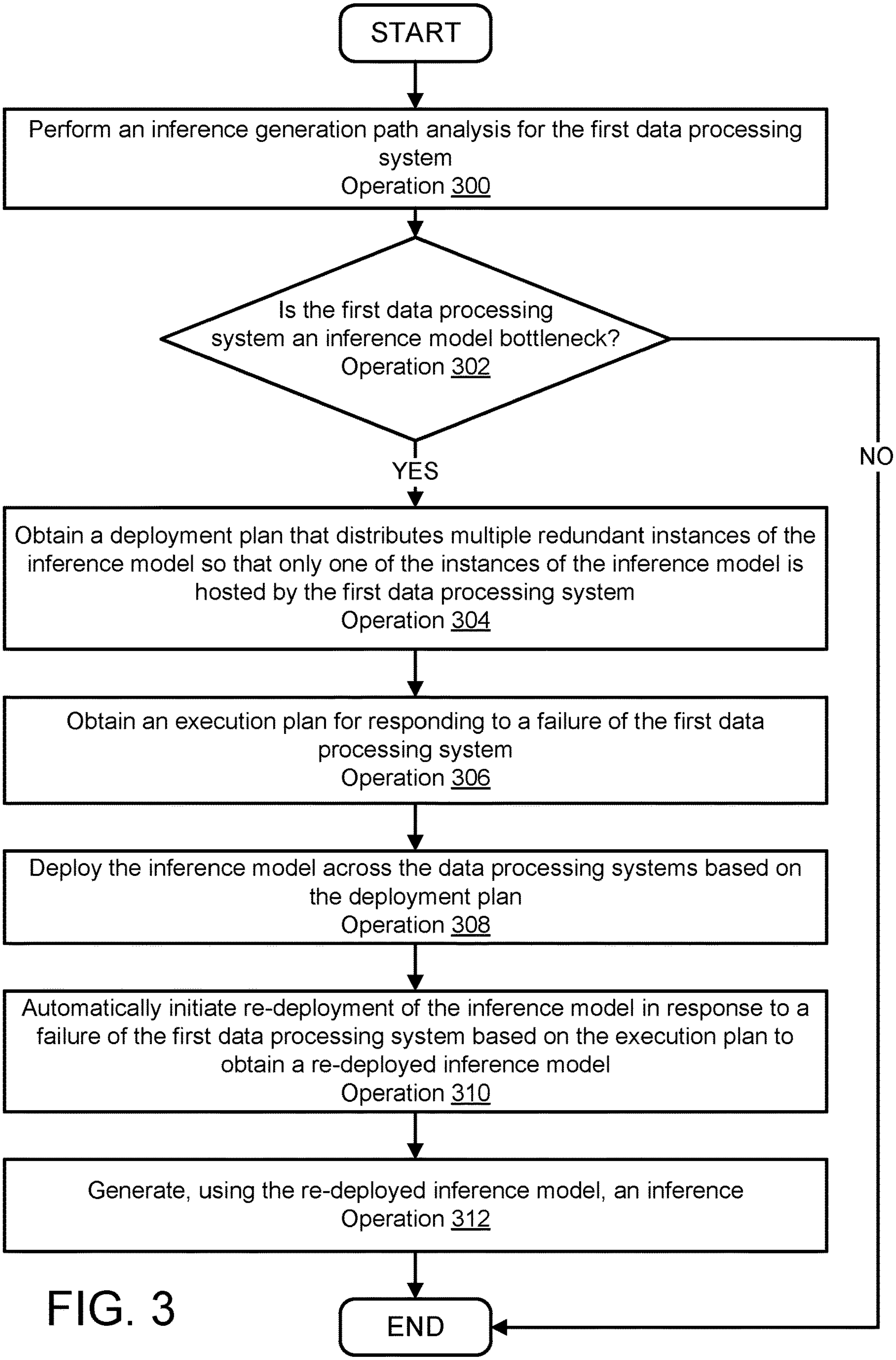
FIG. 3 shows a flow diagram illustrating a method of managing execution of an inference model hosted by data processing systems in accordance with an embodiment.

When performing its functionality, inference model manager 102 and/or data processing systems 100 may perform all, or a portion, of the methods and/or actions shown in FIG. 3.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data processing systems 100 and/or inference model manager 102 are implemented using an internet of things (IoT) device, which may include a computing device. The IoT device may operate in accordance with a communication model and/or management model known to inference model manager 102, other data processing systems, and/or other devices.

Any of the components illustrated in FIG. 1 may be operably connected to each other (and/or components not illustrated) with communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIGS. 2A-2D.

Figure 2A:
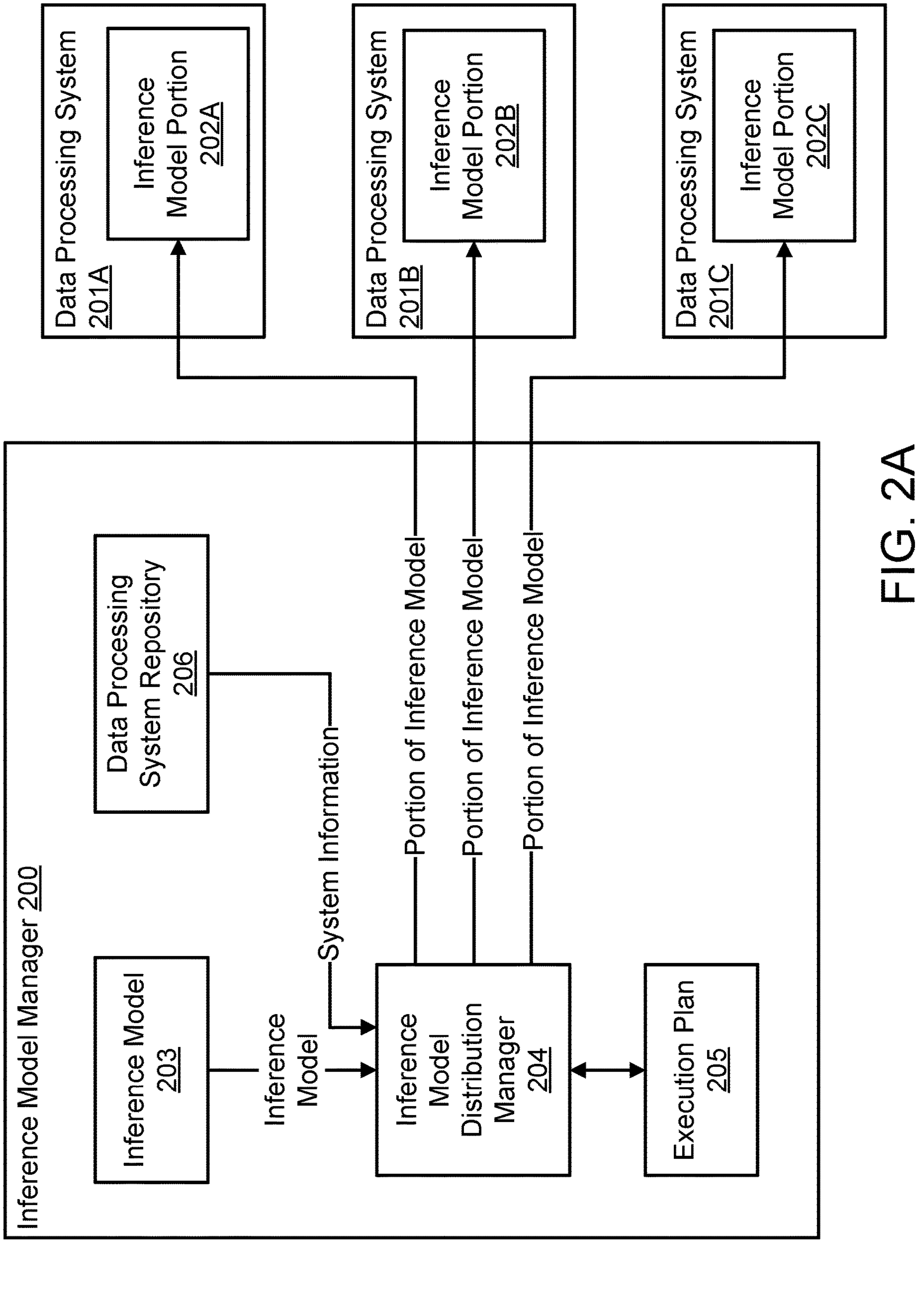
FIG. 2A shows a block diagram illustrating an inference model manager and multiple data processing systems over time in accordance with an embodiment.

FIG. 2A shows a diagram of inference model manager 200 and data processing systems 201A-201C in accordance with an embodiment. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing an inference model across multiple data processing systems that each individually have insufficient computing resources to complete timely execution of the inference model. The computing resources of the individual data processing systems may be insufficient due to: insufficient available storage to host the inference model and/or insufficient processing capability for timely execution of the inference model.

While described below with reference to a single inference model (e.g., inference model 203), the process may be repeated any number of times with any number of inference models without departing from embodiments disclosed herein.

To execute an inference model across multiple data processing systems, inference model manager 200 may obtain inference model portions and may distribute the inference model portions to data processing systems 201A-201C. The inference model portions may be based on: (i) the computing resource availability of data processing systems 201A-201C and (ii) communication bandwidth availability between the data processing systems. By doing so, inference model manager 200 may distribute the computational overhead and bandwidth consumption associated with hosting and operating the inference model across multiple data processing systems while reducing communications between data processing systems 201A-201C throughout the distributed environment.

To obtain inference model portions, inference model manager 200 may host inference model distribution manager 204. Inference model distribution manager 204 may (i) obtain an inference model, (ii) identify characteristics of data processing systems to which the inference model may be deployed, (iii) obtain inference model portions based on the characteristics of the data processing systems and characteristics of the inference model, (iv) obtain an execution plan based on the inference model portions, the characteristics of the data processing systems, and requirements of a downstream consumer (v) distribute the inference model portions to the data processing systems, (vi) initiate execution of the inference model using the inference model portions distributed to the data processing systems and/or (vii) manage the execution of the inference model based on the execution plan.

Inference model manager 200 may obtain inference model 203. Inference model manager 200 may obtain characteristics of inference model 203. The characteristics of inference model 203 may include, for example, a quantity of layers of a neural network inference model and a quantity of relationships between the layers of the neural network inference model. The characteristics of inference model 203 may also include the quantity of computing resources required to host and operate inference model 203. The characteristics of inference model 203 may include other characteristics based on other types of inference models without departing from embodiments disclosed herein.

Each portion of inference model 203 may be distributed to one data processing system throughout a distributed environment. Therefore, prior to determining the portions of inference model 203, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems.

Therefore, inference model distribution manager 204 may obtain a first portion of the inference model (e.g., inference model portion 202A) based on the system information (e.g., the available computing resources) associated with data processing system 201A and based on data dependencies of the inference model so that inference model portion 202A reduces the necessary communications between inference model portion 202A and other portions of the inference model. Inference model distribution manager 204 may repeat the previously described process for inference model portion 202B and inference model portion 202C.

Prior to distributing inference model portions 202A-202C, inference model distribution manager 204 may utilize inference model portions 202A-202C to obtain execution plan 205. Execution plan 205 may include instructions for timely execution of the inference model using the portions of the inference model and based on the needs of a downstream consumer of the inferences generated by the inference model.

Inference model manager 200 may distribute inference model portion 202A to data processing system 201A, inference model portion 202B to data processing system 201B, and inference model portion 202C to data processing system 201C. While shown in FIG. 2A as distributing three portions of the inference model to three data processing systems, the inference model may be partitioned into any number of portions and distributed to any number of data processing systems throughout a distributed environment. Further, while not shown in FIG. 2A, redundant copies of the inference model portions may also be distributed to any number of data processing systems in accordance with an execution plan.

Inference model manager 102 may initiate execution of the inference model using the portions of the inference model distributed to the data processing systems to obtain an inference model result (e.g., one or more inferences). The inference model result may be usable by a downstream consumer to perform a task, make a control decision, and/or perform any other action set (or action).

Inference model manager 102 may manage the execution of the inference model based on the execution plan. Managing execution of the inference model may include monitoring changes to a listing of data processing systems over time and/or revising the execution plan as needed to obtain the inference model result in a timely manner and/or in compliance with the needs of a downstream consumer. An updated execution plan may include re-assignment of data processing systems to new portions of the inference model, re-location of data processing systems to meet the needs of the downstream consumer, determining new inference generation paths to optimize efficiency of inference generation throughout the distributed environment, and/or other instructions. When providing its functionality, inference model manager 200 may use and/or manage agents across any number of data processing systems. These agents may collectively provide all, or a portion, of the functionality of inference model manager 200. As previously mentioned, the process shown in FIG. 2A may be repeated to distribute portions of any number of inference models to any number of data processing systems.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

Figure 2B:
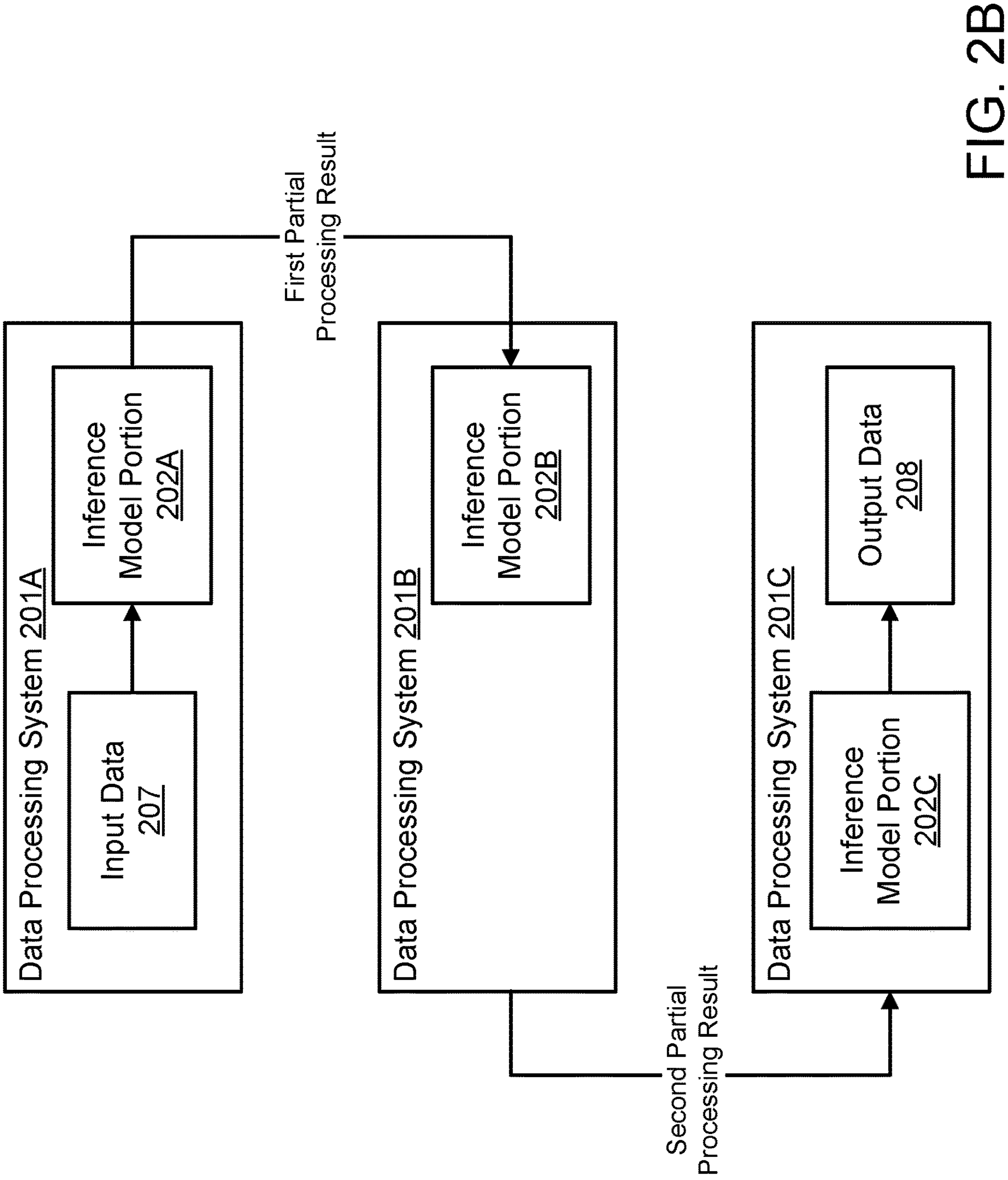
FIG. 2B shows a block diagram illustrating multiple data processing systems over time in accordance with an embodiment.

Turning to FIG. 2B, data processing systems 201A-201C may execute the inference model. To do so, data processing system 201A may obtain input data 207. Input data 207 may include any data of interest to a downstream consumer of the inferences. For example, input data 207 may include data indicating the operability and/or specifications of a product on an assembly line.

Input data 207 may be fed into inference model portion 202A to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C to obtain output data 208. Output data 208 may include inferences collectively generated by the portions of the inference model distributed across data processing systems 201A-201C.

Output data 208 may be utilized by a downstream consumer of the data to perform a task, make a decision, and/or perform any other action set that may rely on the inferences generated by the inference model. For example, output data 208 may include a quality control determination regarding a product manufactured in an industrial environment. Output data 208 may indicate whether the product meets the quality control standards and should be retained or does not meet the quality control standards and should be discarded. In this example, output data 208 may be used by a robotic arm to decide whether to place the product in a “retain” area or a “discard” area.

While shown in FIG. 2B as including three data processing systems, a system may include any number of data processing systems to collectively execute the inference model. Additionally, as noted above, redundant copies of the inference model hosted by multiple data processing systems may each be maintained so that termination of any portion of the inference model may not impair the continued operation of the inference model. In addition, while described in FIG. 2B as including one inference model, the system may include multiple inference models distributed across multiple data processing systems.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system 201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

By executing an inference model across multiple data processing systems, computing resource expenditure throughout the distributed environment may be reduced. In addition, by managing execution of the inference model, the functionality and/or connectivity of the data processing systems may be adapted over time to remain in compliance with the needs of a downstream consumer.

Figure 2C:
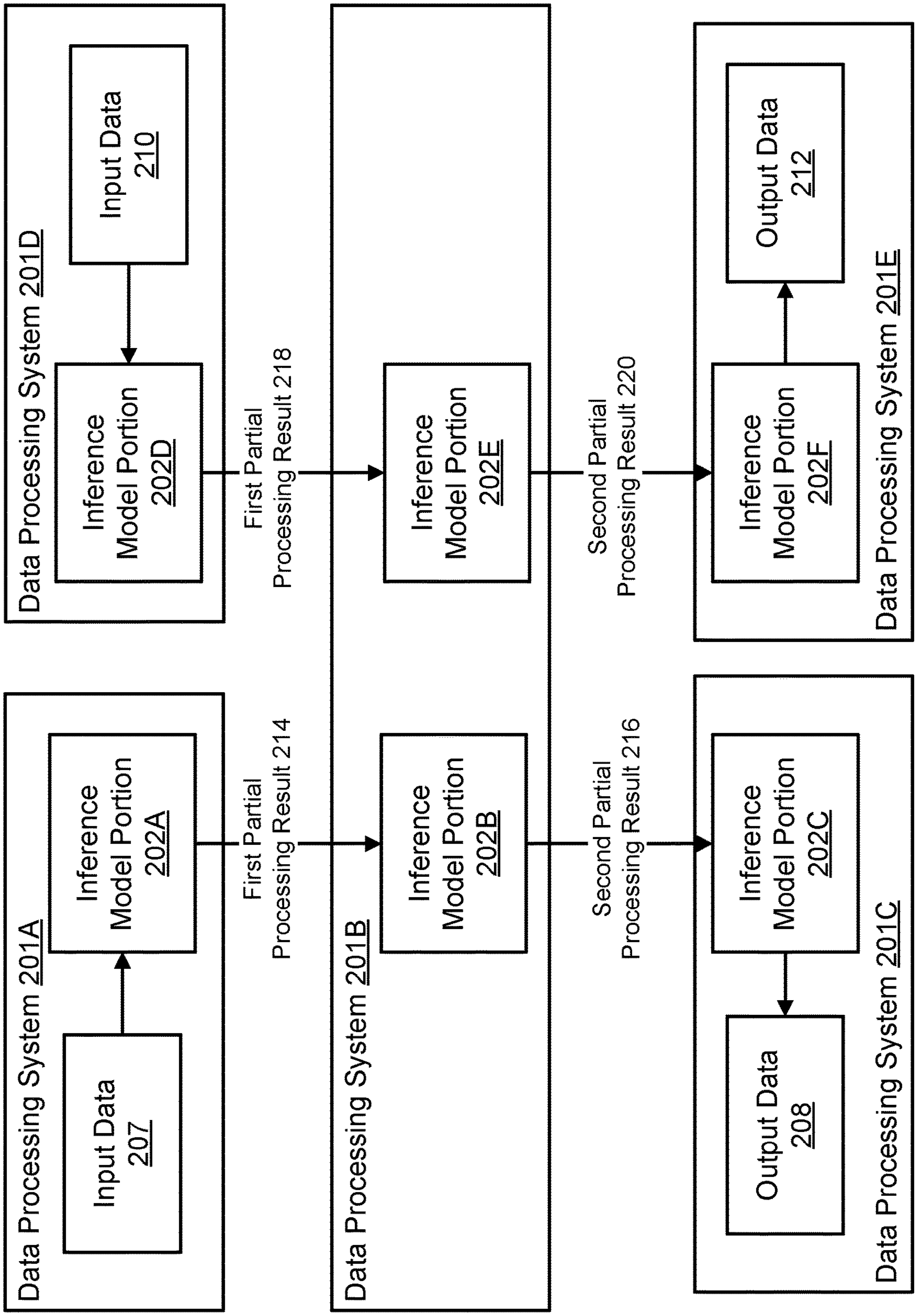
FIG. 2C shows a block diagram illustrating an inference model bottleneck over time in accordance with an embodiment.

Turning to FIG. 2C, consider a scenario in which two redundant instances of the inference model are deployed across multiple data processing systems throughout the distributed environment. The first redundant instance of the inference model may be executed using inference model portions 202A-202C as previously described in FIG. 2B. They second redundant instance of the inference model may be executed using inference model portions 202D-202F. To execute the second instance of the inference model, data processing system 210D may obtain input data 210 and may feed input data 210 into inference model portion 202D to obtain first partial processing result 218. Data processing system 201D may transmit first partial processing result 218 to data processing system 201B. In this scenario, data processing system 201B hosts inference model portion 202E (associated with the second redundant instance of the inference model) and inference model portion 202B (associated with the first redundant instance of the inference model). Data processing system 201B may feed first partial processing result 218 into inference model portion 202E to obtain second partial processing result 220. Data processing system 201B may transmit second partial processing result 220 to data processing system 201E. Data processing system 201E may feed second partial processing result 220 into inference model portion 202E to obtain output data 212.

Inference model manager 200 may determine that data processing system 201B has a risk of failure to execute inference model portions 202B and 202E above a threshold (e.g., due to inclement weather approaching the location of data processing system 201). Inference model manager 200 may then determine that data processing system 201B is an inference model bottleneck. An inference model bottleneck may be any data processing system hosting more than one redundant copy of a portion of an inference model. Failure of the inference model bottleneck may prevent timely execution of one or more redundant instances of the inference model. If all redundant instances of the portion of the inference model are hosted by the inference model bottleneck, failure of the inference model bottleneck may prevent timely execution of all of the redundant instances of the inference model deployed across the data processing systems.

Inference model manager 200 may identify data processing system 201B as an inference model bottleneck by determining that there are two inference generation paths that utilize data processing system 201B. An inference generation path may include a listing of instances of each of the portions of the inference model usable to generate an inference model result and an ordering of the listing of the instances. A first inference generation path may include inference model portions 202A-202C and a second inference generation path may include inference model portions 202D-202F.

Figure 2D:
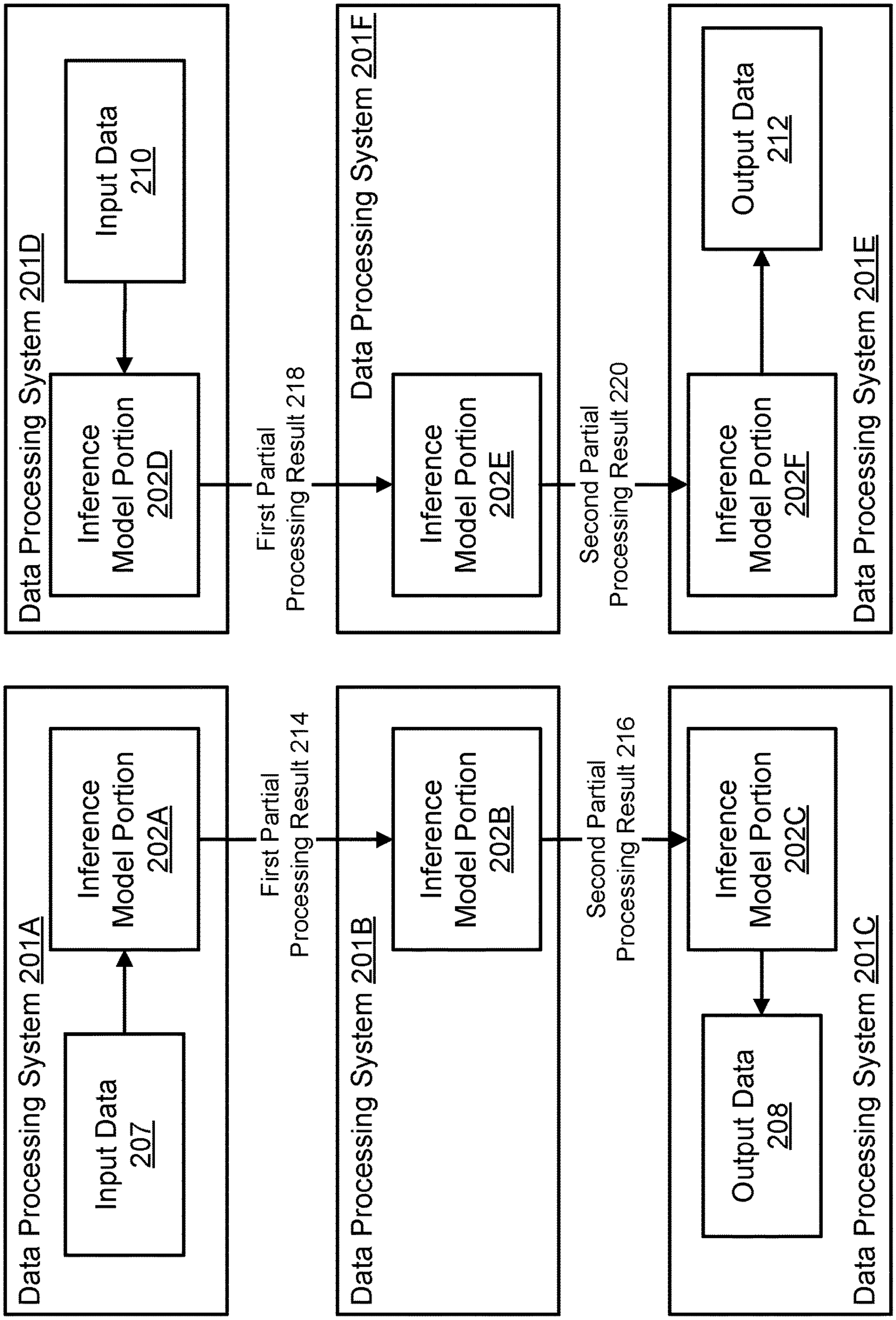
FIG. 2D shows a re-deployed inference model over time in accordance with an embodiment.

Turning to FIG. 2D, inference model manager may proactively address the inference model bottleneck by obtaining a deployment plan. The deployment plan may ensure that each data processing system of the data processing systems is part of only one inference generation path for the inference model. The deployment plan may include an updated inference generation path indicating that data processing system 201F (formerly not hosting a portion of the inference model) should host and operate inference model portion 202E instead of data processing system 201B. Therefore, the updated inference generation path may include inference model portions 202D, 202E, and 202F hosted by data processing system 201D, 201F, and 201E respectively.

The deployment plan may also include inference generation instructions for data processing systems that are members of the updated inference generation path (e.g., data processing systems 201D, 201F, and 201E). The inference generation instructions may indicate a processing result transmission destination for each of the data processing systems that are members of the updated inference generation plan. For example, the processing result transmission destination for data processing system 201F may be data processing system 201E.

Inference model manager 200 may also obtain an execution plan for responding to a failure of a first data processing system (data processing system 201). The execution plan may ensure that one or more other inference model bottlenecks are not formed when the inference model is re-deployed across the data processing systems based on the execution plan. The execution plan may also indicate a failover inference generation path for an instance of the inference model hosted by the first data processing system (e.g., data processing system 201). The failover inference generation path may include an updated listing of the instances of each of the portions of the inference model usable to generate the inference model result, the updated listing indicating replacement of data processing system 201B with a third data processing system (not shown), and the third data processing system not hosting any portion of the inference model prior to the failure of the first data processing system.

Inference model manager 200 may deploy the inference model to data processing systems 201D, 201E, and 201F in accordance with the deployment plan. In the event of failure of data processing system 201B, inference model manager 200 may automatically initiate re-deployment of the inference model in accordance with the execution plan. By doing so, the likelihood of successful completion of inference generation by at least one instance of the inference model may be increased throughout the distributed environment.

As discussed above, the components of FIG. 1 may perform various methods to execute an inference model throughout a distributed environment. FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing execution of an inference model hosted by data processing systems is shown. The operations in FIG. 3 may be performed by inference model manager 102 and/or data processing systems 100. Other entities may perform the operations shown in FIG. 3 without departing from embodiments disclosed herein.

Prior to the operations shown in FIG. 3, a first data processing system of the data processing systems may be identified as having a level of risk of failing to execute a portion of the inference model above a threshold. The level of risk may be determined by inference model manager 102 and/or by another entity throughout the distributed environment. To determine the level of risk, data (e.g., meteorological data, other external data related to the ambient environment surrounding the first data processing system, and/or other data) may be obtained. The level of risk may be obtained by feeding the data into an inference model trained to determine a level of risk as output data when given the data as an ingest. The level of risk may be determined via other methods without departing from embodiments disclosed herein. The level of risk may be compared to the threshold. The threshold may be set by a downstream consumer of the inferences generated by the inference model and/or by any other entity. The operations shown in FIG. 3 may be performed based on this identification.

At operation 300, an inference generation path analysis is performed for the first data processing system. The inference path analysis may be performed by: (i) identifying one or more portions of the inference model hosted by the first data processing system, (ii) making an identification of an inference generation path associated with each of the one or more portions of the inference model hosted by the first data processing system, and/or (iii) if there is more than one inference generation path associated with the first data processing system: identifying the first data processing system as an inference model bottleneck.

In an embodiment, the one or more portions of the inference model hosted by the first data processing system are identified by requesting operational data from the first data processing system. The operational data may include a listing of the portions of the inference model hosted by the data processing system and/or other data. An operational data transmission schedule may also be transmitted to the first data processing system. The operational data transmission schedule may prompt the first data processing system to transmit operational data at regular intervals (e.g., once per hour, once per day, etc.).

In an embodiment, the inference generation path associated with each of the one or more portions of the inference model hosted by the first data processing system is identified by utilizing an inference generation path lookup table. The inference generation path lookup table may include a listing of each portion of the inference model deployed throughout the distributed environment and an identifier of the inference generation path associated with each portion of the inference model. The inference generation paths may be identified by performing a lookup using the lookup table and an identity of the respective data processing systems as a key for the lookup table. The lookup may return a listing of the portions of the inference model hosted by the identified data processing system. Identification of the inference generation paths may be performed via other methods without departing from embodiments disclosed herein.

At operation 302, it is determined whether the first data processing system is an inference model bottleneck based on the inference generation path analysis. The determination may be made by counting the previously identified inference generation paths associated with the first data processing system. The first data processing system may be an inference model bottleneck if more than one inference generation path is associated with the first data processing system.

If the first data processing system is not an inference model bottleneck, the method may end following operation 302. If the first data processing system is an inference model bottleneck, the method may proceed to operation 304. As previously mentioned, the determination may be based on the identified inference generation paths associated with the first data processing system.

At operation 304, a deployment plan is obtained that distributes multiple redundant instances of the inference model so that only one of the instances of the inference model is hosted by the first data processing system. The deployment plan may be obtained by: (i) identifying one or more portions of the inference model hosted by the first data processing system, (ii) identifying a second data processing system that currently is not hosting any portions of the inference model, (iii) obtaining an updated inference generation path for one of the portions of the inference model hosted by the first data processing system based on the second data processing system, and/or (iv) obtaining inference generation instructions for the data processing systems that are members of the updated inference generation path.

As previously mentioned, a listing of the one or more portions of the inference model may be obtained by obtaining operational data from the first data processing system. In an embodiment, the second data processing system is identified by deploying the second data processing system to the distributed environment. The second data processing system may also be identified by monitoring a listing of data processing systems currently deployed throughout the distributed environment (via obtaining operational data and/or via other methods). A data processing system from the listing of data processing systems not currently hosting a portion of the inference model may be selected as the second data processing system. The second data processing system may be identified via other methods without departing from embodiments disclosed herein.

In an embodiment, the updated inference generation path is generated by amending the inference generation path associated with one of the instances of the portion of the inference model hosted by the first data processing system to include the second data processing system instead of the first data processing system.

In an embodiment, the inference generation instructions are obtained using the updated inference generation path.

At operation 306, an execution plan is obtained for responding to a failure of the first data processing system. The execution plan may ensure that one or more other inference model bottlenecks are not formed when the only one of the instances of the inference model is re-deployed across the data processing systems based on the execution plan. The execution plan may be obtained by: (i) identifying a third data processing system not currently hosting a portion of the inference model, (ii) obtaining a failover inference generation path based on the third data processing system, (iii) obtaining the execution plan based on the failover inference generation path.

In an embodiment, the third data processing system is identified by monitoring a listing of data processing systems currently deployed throughout the distributed environment (via obtaining operational data and/or via other methods). A data processing system from the listing of data processing systems not currently hosting a portion of the inference model may be selected as the third data processing system. The third data processing system may be identified via other methods without departing from embodiments disclosed herein.

In an embodiment, the failover inference generation path is obtained by amending the inference generation path associated with one of the instances of the portion of the inference model hosted by the first data processing system to include the third data processing system instead of the first data processing system. For additional details regarding the failover inference generation path, refer to FIG. 2D.

In an embodiment, the execution plan is obtained by generating instructions for implementing the updated inference generation path throughout the distributed environment in response to the failure of the first data processing system. The execution plan may include a listing of the data processing systems that are members of the updated inference generation path and the portions of the instances of the inference model hosted by each of the members of the updated inference generation path.

At operation 308, the inference model is deployed across the data processing systems based on the deployment plan. The inference model may be deployed by distributing (if necessary) additional instances of portions of the inference model according to the deployment plan and configuring the data processing systems that are members of the updated inference generation path to forward processing results based on the inference generation instructions.

At operation 310, re-deployment of the inference model is automatically initiated in response to a failure of the first data processing system based on the execution plan to obtain a re-deployed inference model. Automatically initiating re-deployment of the inference model may include: (i) identifying the failure of the first data processing system, (ii) identifying the failover inference generation path based on the execution plan, and/or (iii) re-deploying the inference model based on the failover inference generation path.

In an embodiment, the failure of the first data processing system is identified based on a failure to obtain operational data from the first data processing system. The first data processing system may transmit operational data at regular intervals (e.g., once per hour, once per day, etc.). Failing to obtain operational data from the first data processing system at the expected time (and/or upon request for operational data) may indicate failure of the first data processing system.

In an embodiment, the failover inference generation path is obtained by generating the failover inference generation path as previously described with respect to operation 306, and/or by obtaining the inference generation path from another entity responsible for generating inference generation paths based on the failure of the first data processing system.

In an embodiment, the inference model is re-deployed by: (i) deploying the portion of the inference model hosted by the first data processing system to the third data processing system, and (ii) transmitting updated inference generation instructions to the data processing systems, the updated inference generation instructions being based, at least in part, on the failover inference generation path.

In an embodiment, deploying the portion of the inference model hosted by the first data processing system to the third data processing system may be performed by: (i) identifying the portion of the inference model hosted by the first data processing system (via operational data and/or other data), and (ii) deploying the portion of the first inference model hosted by the first data processing system to the third data processing system. Instructions for deploying the portion of the inference model hosted by the first data processing system may be obtained based on the identification and may be transmitted to another entity responsible for deploying the inference model.

In an embodiment, transmitting updated inference generation instructions to the data processing systems may include: (i) generating (and/or otherwise obtaining) the updated inference generation instructions, and (ii) transmitting the updated inference generation instructions via a communication system (e.g., communication system 101).

At operation 312, an inference is generated using the re-deployed inference model. The inference may be generated by transmitting instructions and/or commands to data processing systems 100 to initiate the execution of the re-deployed inference model.

In an embodiment, the inference is generated using input data. The input data may be obtained and transmitted to data processing systems responsible for ingesting input data for each redundant instance of the inference model.

The method may end following operation 312.

Managing the execution of the inference model may be performed by inference model manager 102 and/or data processing systems 100. In a first example, the system may utilize a centralized approach to managing the execution of the inference model. In the centralized approach, an off-site entity (e.g., a data processing system hosting inference model manager 102) may make decisions and perform the operations detailed in FIG. 3. In a second example, the system may utilize a de-centralized approach to managing the execution of the inference model. In the de-centralized approach, data processing systems 100 may collectively make decisions and perform the operations detailed in FIG. 3. In a third example, the system may utilize a hybrid approach to managing the execution of the inference model. In the hybrid approach, and offsite entity may make high-level decisions (e.g., whether the data processing systems are at risk of unsuccessful completion of a portion of the inference model) and may delegate implementation-related decisions (e.g., how to re-configure the data processing systems to avoid inference model bottlenecks) to data processing systems 100. Execution of the inference model may be managed via other methods without departing from embodiments disclosed herein.

Using the method illustrated in FIG. 3, embodiments disclosed herein may improve the reliability of distributed computations performed by data processing systems. For example, the method may facilitate re-deployment of an inference model so that redundant instances of the inference model are only hosted by one data processing system.

Figure 4:
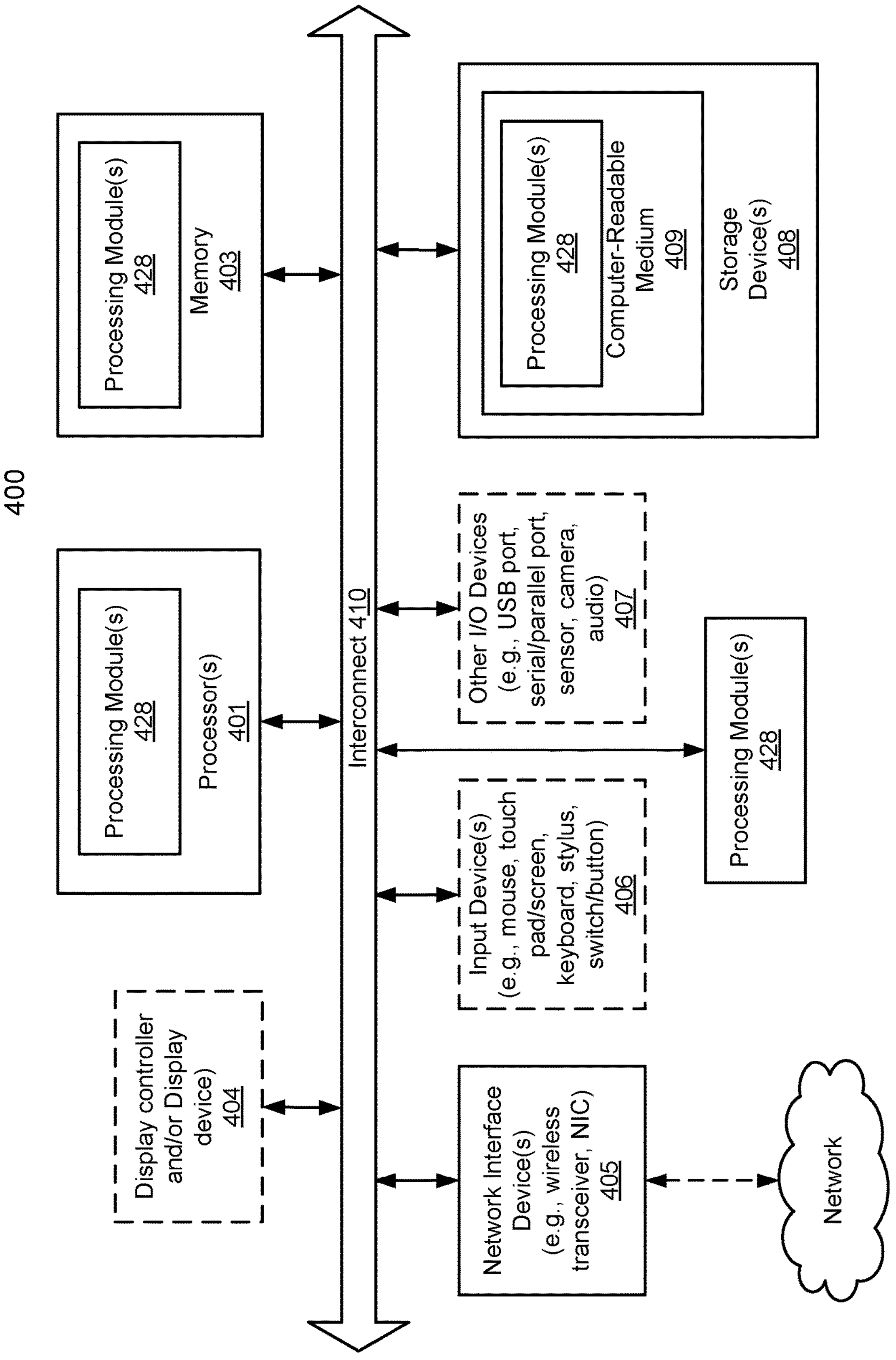
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows© operating system from Microsoft©, Mac OS©/iOS© from Apple, Android© from Google©, Linux©, Unix©, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing execution of an inference model hosted by data processing systems, the method comprising:

identifying a first instance of the inference model hosted by the data processing systems, where each instance of the inference model hosted by the data processing systems is segmented into an ordered list of inference model portions that form an inference generation path, and each inference model portion of a given inference generation path is assigned to one data processing system of the data processing systems;

identifying that a first data processing system of the data processing systems has a level of risk of failing to execute a first inference model portion of the first instance of inference model that is above a threshold;

performing an inference generation path analysis for the first data processing system to identify whether the first data processing system is an inference model bottleneck by:

identifying, in addition to the first inference model portion corresponding to the first instance, a second inference model portion hosted by the first data processing system;

identifying, based on the second inference model portion, a second inference generation path and a second instance of the inference model associated with the first data processing system; and identifying the first data processing system as the inference model bottleneck based on the first data processing system hosting more than one instance of the inference model;

obtaining a deployment plan that redistributes the second instance of the inference model so that that each data processing system of the data processing systems is part of only one inference generation path and contributes to only one instance of the inference model;

based on the deployment plan, redistributing the second instance of the inference model by re-deploying the second inference model portion from the first data processing system to a second data processing system;

obtaining an execution plan for responding to a failure of the first data processing system, the execution plan ensuring that one or more other inference model bottlenecks are not formed when the first instance of the inference model is re-deployed across the data processing systems in response to the failure of the first data processing system;

based on the execution plan, automatically initiating re-deployment of the first instance of the inference model in response to the failure of the first data processing system to obtain a re-deployed first instance of the inference model; and generating, using the re-deployed first instance of the inference model, an inference.

2. The method of claim 1, wherein a failure of the inference model bottleneck prevents timely execution of one or more redundant instances of the inference model.

3. The method of claim 2, wherein the failure of the inference model bottleneck prevents timely execution of all of the redundant instances of the inference model deployed across the data processing systems.

4. The method of claim 1, wherein, for a given instance of the inference model, the corresponding inference generation path comprises:

a listing of each of the model inference portions usable to generate an inference model result for the given instance; and an ordering of the listing.

5. The method of claim 4, wherein obtaining the deployment plan comprises:

identifying the second inference model portion hosted by the first data processing system;

identifying the second data processing system, the second data processing system currently not hosting any instances of the inference model;

obtaining an updated inference generation path for the second inference model portion hosted by the first data processing system based on the second data processing system; and obtaining inference generation instructions for the data processing systems that are members of the updated inference generation path.

6. The method of claim 5, wherein the inference generation instructions indicate a processing result transmission destination for each of the data processing systems that are members of the updated inference generation path.

7. The method of claim 6, wherein redistributing the second instance of the inference model based on the deployment plan comprises:

configuring the data processing systems that are members of the updated inference generation path to forward processing results based on the inference generation instructions.

8. The method of claim 4, wherein the execution plan indicates a failover inference generation path for the first instance of the inference model hosted by the first data processing system.

9. The method of claim 8, wherein the failover inference generation path comprises:

an updated listing of the inference model portions of the re-deployed first instance of the inference model usable to generate the inference, the updated listing indicating replacement of the first data processing system with a third data processing system responsive to the failure of the first data processing system, and the third data processing system not hosting any instances of the inference model prior to the failure of the first data processing system.

10. The method of claim 9, wherein automatically initiating re-deployment of the inference model comprises:

identifying the failure of the first data processing system;

identifying the failover inference generation path based on the execution plan; and re-deploying the first instance of the inference model based on the failover inference generation path.

11. The method of claim 10, wherein re-deploying the first instance of the inference model comprises:

deploying the first inference model portion hosted by the first data processing system to the third data processing system; and transmitting updated inference generation instructions to the data processing systems, the updated inference generation instructions being based, at least in part, on the failover inference generation path.

12. A non-transitory machine-readable medium having instructions stored therein, which when executed by a processor, cause the processor to perform operations for managing execution of an inference model hosted by data processing systems, the operations comprising:

identifying a first instance of the inference model hosted by the data processing systems, where each instance of the inference model hosted by the data processing systems is segmented into an ordered list of inference model portions that form an inference generation path, and each inference model portion of a given inference generation path is assigned to one data processing system of the data processing systems;

identifying that a first data processing system of the data processing systems has a level of risk of failing to execute a first inference model portion of the first instance of inference model that is above a threshold;

performing an inference generation path analysis for the first data processing system to identify whether the first data processing system is an inference model bottleneck by:

identifying, in addition to the first inference model portion corresponding to the first instance, a second inference model portion hosted by the first data processing system;

identifying, based on the second inference model portion, a second inference generation path and a second instance of the inference model associated with the first data processing system; and identifying the first data processing system as the inference model bottleneck based on the first data processing system hosting more than one instance of the inference model;

obtaining a deployment plan that redistributes the second instance of the inference model so that that each data processing system of the data processing systems is part of only one inference generation path and contributes to only one instance of the inference model;

based on the deployment plan, redistributing the second instance of the inference model by re-deploying the second inference model portion from the first data processing system to a second data processing system;

obtaining an execution plan for responding to a failure of the first data processing system, the execution plan ensuring that one or more other inference model bottlenecks are not formed when the first instance of the inference model is re-deployed across the data processing systems in response to the failure of the first data processing system;

based on the execution plan, automatically initiating re-deployment of the first instance of the inference model in response to the failure of the first data processing system to obtain a re-deployed first instance of the inference model; and generating, using the re-deployed first instance of the inference model, an inference.

13. The non-transitory machine-readable medium of claim 12, wherein a failure of the inference model bottleneck prevents timely execution of one or more redundant instances of the inference model.

14. The non-transitory machine-readable medium of claim 13, wherein the failure of the inference model bottleneck prevents timely execution of all of the redundant instances of the inference model deployed across the data processing systems.

15. A data processing system, comprising:

a processor; and a memory coupled to the processor to store instructions, which when executed by the processor, cause the processor to perform operations for managing execution of an inference model hosted by data processing systems, the operations comprising:

identifying a first instance of the inference model hosted by the data processing systems, where each instance of the inference model hosted by the data processing systems is segmented into an ordered list of inference model portions that form an inference generation path, and each inference model portion of a given inference generation path is assigned to one data processing system of the data processing systems;

identifying that a first data processing system of the data processing systems has a level of risk of failing to execute a first inference model portion of the first instance of inference model that is above a threshold;

performing an inference generation path analysis for the first data processing system to identify whether the first data processing system is an inference model bottleneck by:

identifying, in addition to the first inference model portion corresponding to the first instance, a second inference model portion hosted by the first data processing system;

identifying, based on the second inference model portion, a second inference generation path and a second instance of the inference model associated with the first data processing system; and identifying the first data processing system as the inference model bottleneck based on the first data processing system hosting more than one instance of the inference model;

obtaining a deployment plan that redistributes the second instance of the inference model so that that each data processing system of the data processing systems is part of only one inference generation path and contributes to only one instance of the inference model;

based on the deployment plan, redistributing the second instance of the inference model by re-deploying the second inference model portion from the first data processing system to a second data processing system;

obtaining an execution plan for responding to a failure of the first data processing system, the execution plan ensuring that one or more other inference model bottlenecks are not formed when the first instance of the inference model is re-deployed across the data processing systems in response to the failure of the first data processing system;

based on the execution plan, automatically initiating re-deployment of the first instance of the inference model in response to the failure of the first data processing system to obtain a re-deployed first instance of the inference model; and generating, using the re-deployed first instance of the inference model, an inference.

16. The data processing system of claim 15, wherein a failure of the inference model bottleneck prevents timely execution of one or more redundant instances of the inference model.

17. The data processing system of claim 15, wherein, for a given instance of the inference model, the corresponding inference generation path comprises:

a listing of each of the model inference portions usable to generate an inference model result for the given instance; and an ordering of the listing.

18. The data processing system of claim 17, wherein obtaining the deployment plan comprises:

identifying the second inference model portion hosted by the first data processing system;

identifying the second data processing system, the second data processing system currently not hosting any instances of the inference model;

obtaining an updated inference generation path for the second inference model portion hosted by the first data processing system based on the second data processing system; and obtaining inference generation instructions for the data processing systems that are members of the updated inference generation path.

19. The data processing system of claim 18, wherein the inference generation instructions indicate a processing result transmission destination for each of the data processing systems that are members of the updated inference generation path.

20. The data processing system of claim 19, wherein redistributing the second instance of the inference model based on the deployment plan comprises:

configuring the data processing systems that are members of the updated inference generation path to forward processing results based on the inference generation instructions.

* * * * *